United States Patent
Rashkovskiy

(10) Patent No.: US 6,912,504 B1
(45) Date of Patent: Jun. 28, 2005

(54) DISTRIBUTING TELEVISION ADVERTISEMENTS OVER THE INTERNET

(75) Inventor: Oleg B. Rashkovskiy, Cupertino, CA (US)

(73) Assignee: BlackArrow, Inc., San Mateo, CA (US)

(*) Notice: Subject to any disclaimer, the term of this patent is extended or adjusted under 35 U.S.C. 154(b) by 515 days.

(21) Appl. No.: 09/560,458

(22) Filed: Apr. 28, 2000

(51) Int. Cl.⁷ ............................................. G06F 17/60
(52) U.S. Cl. ...................................................... 705/14
(58) Field of Search ........................................ 705/14

(56) References Cited

U.S. PATENT DOCUMENTS

| | | | |
|---|---|---|---|
| 3,919,479 A | * 11/1975 | Moon et al. ................. 704/237 |
| 5,515,098 A | 5/1996 | Carles ............................ 348/8 |
| 5,661,516 A | 8/1997 | Carles ............................ 348/8 |
| 5,668,950 A | 9/1997 | Kikuchi et al. ......... 395/200.47 |
| 5,761,606 A | * 6/1998 | Wolzien ...................... 725/110 |
| 5,774,664 A | * 6/1998 | Hidary et al. ............... 725/110 |
| 5,794,210 A | 8/1998 | Goldhaber et al. ........... 705/14 |
| 5,816,918 A | 10/1998 | Kelly et al. ................... 463/16 |
| 5,823,879 A | 10/1998 | Goldberg et al. ............. 463/42 |
| 5,855,008 A | 12/1998 | Goldhaber et al. ........... 705/14 |
| 5,864,823 A | 1/1999 | Levitan ....................... 104/14 |
| 5,918,213 A | 6/1999 | Bernard et al. ............... 705/26 |
| 5,933,811 A | 8/1999 | Angles et al. ................ 705/14 |
| 5,961,603 A | 10/1999 | Kunkel et al. .............. 709/229 |
| 6,002,393 A | 12/1999 | Hite et al. ................... 345/327 |
| 6,005,599 A | 12/1999 | Asai et al. ..................... 348/7 |
| 6,144,944 A | 11/2000 | Kurtzman, II et al. ........ 705/14 |
| 6,178,446 B1 | 1/2001 | Gerszberg et al. .......... 709/217 |
| 6,186,893 B1 | 2/2001 | Walker et al. ................ 463/20 |
| 6,188,398 B1 | 2/2001 | Collins-Rector et al. .... 345/327 |
| 6,216,112 B1 | 4/2001 | Fuller et al. .................. 705/14 |
| 6,216,129 B1 | 4/2001 | Eldering ...................... 707/10 |
| 6,243,375 B1 | 6/2001 | Speicher ..................... 370/352 |
| 6,246,441 B1 | 6/2001 | Terakado et al. ........... 348/552 |
| 6,246,693 B1 | 6/2001 | Davidson et al. ........... 370/445 |

OTHER PUBLICATIONS

Gillen, Marilyn A., "Ads Begin to Pop Up In CD–ROMs, Games; Ads Begin in Video & Games and CD–ROM," Billboard, Mar. 25, 1995, pp. 58.

* cited by examiner

*Primary Examiner*—Donald L. Champagne
(74) *Attorney, Agent, or Firm*—Trop, Pruner & Hu, P.C.

(57) ABSTRACT

A client processor-based system may receive software from a web site server as well as information about when commercial advertisements will be distributed over video distribution systems. This information may be used by the client processor-based system to automatically record commercial broadcast from a video distribution system. The recorded commercial broadcast may then be automatically replayed in the course of using content or services received in return for playing the commercial advertisement.

12 Claims, 4 Drawing Sheets

DISTRIBUTING TELEVISION ADVERTISEMENTS OVER THE INTERNET

BACKGROUND

This invention relates generally to the Internet and specifically to techniques for distributing advertising materials.

Currently, a large number of web sites on the Internet provide free access to all corners. Many of these sites are supported by banner advertisements that are displayed above the content contained on the web site. The web site owner earns a license fee for every user who selects the banner advertisement.

It is possible to provide a wide variety of electronic content over the Internet, including web site content. In addition to the content conventionally provided through access to web sites, users may be afforded opportunities over the Internet to download software, play games and to use services. Currently there is no effective way to profit from such activities other than through the imposition of banner ads. While banner ads are useful in connection with web sites, they become awkward in connection with other types of content such as software, games and the like.

Thus, there is a need for better ways to provide advertising over the Internet to support various services and content that may be received over the Internet.

DETAILED DESCRIPTION

Figure 1:
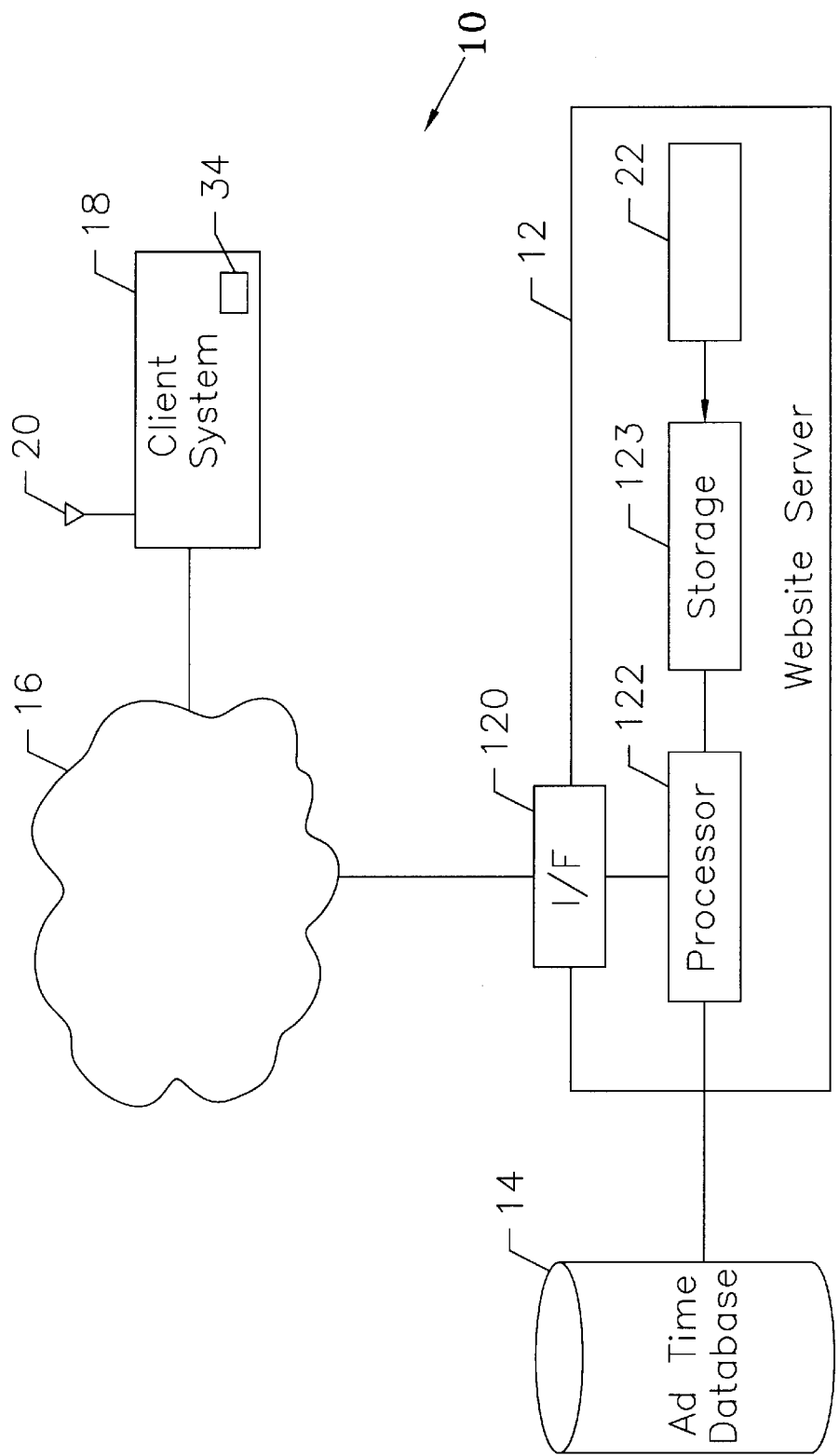
FIG. 1 is a schematic depiction of one embodiment of the present invention.

Referring to FIG. 1, an advertisement distribution system 10 may include a web site server 12 coupled to the Internet 16. The web site server 12 may include an Internet interface 120 that may be a modem for example. The web site server 12 may be a processor-based system with a processor 122 coupled to a storage 123 storing advertising distribution software 22. The web site server 12 may also include an advertisement time database 14.

The advertisement time database 14 may store information about certain advertisements that are to be broadcast over video distribution systems. For example, the advertisement time database 14 may store the channels and times (in particular localities) when certain advertisements will be broadcast. The advertisements may actually be broadcast over a video distribution system such as an airwave broadcast, a satellite distribution or a cable distribution system.

The web site server 12 may be accessed over the Internet 16 by one or more client systems 18. The client system 18 may include an interface such as an antenna or other port 20 for receiving a video distribution. The client system 18 may also store software 34 for operating in conjunction with the web site server 12.

Client systems 18 may be set-top boxes, in accordance with one embodiment of the present invention. Conventionally, a set-top box uses a television receiver as a display and receives television programming through an interface, such as a television tuner/capture card. Moreover, the set-top box may also accomplish conventional computer functions such as accessing the Internet.

In accordance with one embodiment of the present invention, the client system 18 may access the web site server 12 and the advertisement time database 14 to obtain information about when certain commercial advertisements will be broadcast over a video distribution system. Having this information, the client system 18 may receive those advertisements through the port 20 and may record and store those advertisement broadcasts. The commercial broadcast may then be replayed in the course of using content downloaded from the Internet 16, such as content from the web site server 12.

The type of content that may be downloaded in return for interposing advertisements is essentially unlimited. It may include access to a given web site, the provision of services from a web site, the use of software applications, and access to games, to name a few examples.

Figure 2:
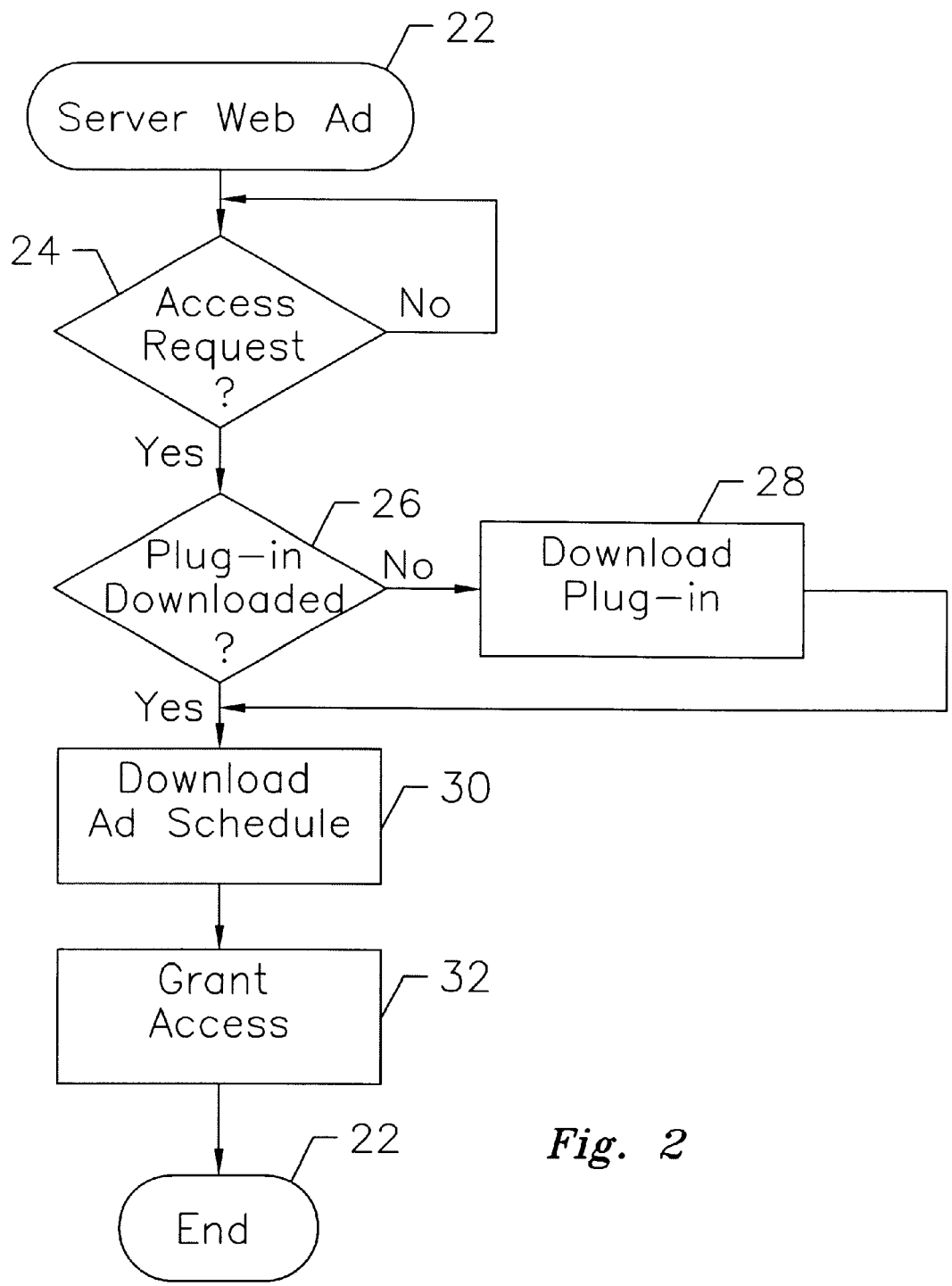
FIG. 2 is a flow chart showing software implemented on a web site server in accordance with one embodiment of the present invention.

Referring to FIG. 2, the software 22 on the web site server 12, in accordance with one embodiment of the present invention, begins upon receiving a request over the Internet 16 from the client system 18, as indicated in diamond 24. Once the request is received, a check at diamond 26 determines whether the client system 18 has been configured to insert advertisements into the content that may be provided by the web site server 12. The client system 18 may be configured using software, hardware or a port that receives instructions from a remote location, as examples.

In one embodiment of the invention, the check at diamond 26, determines whether the software 34 has been preloaded on the client system 18. If the software 34 has already been downloaded to the client system 18 requesting access to the web site server 12, then as shown in block 30, a schedule of advertisements may be automatically downloaded to the requesting client system 18. The software 34 may, for example, be in the form of a plug-in according to one embodiment of the invention.

If the software 34 has not been downloaded, software 34 may be downloaded to the client system 18, for example, by an Internet download, as indicated in block 28. The information for the software 34 may also be downloaded through a back channel, for example, a telephone network connection. In one embodiment, the software 34 is a browser plug-in.

Once the client system 18 has received the software 34, and in return for accepting the software 34, it is then authorized to access content or services, as shown at block 32. The software 34 enables advertisements broadcast at specific times over a video distribution system to be stored on the client system 18 and replayed at periodic intervals. The advertisements are replayed in return for continuing access to the content or services provided through the web site server 12.

Figure 3:
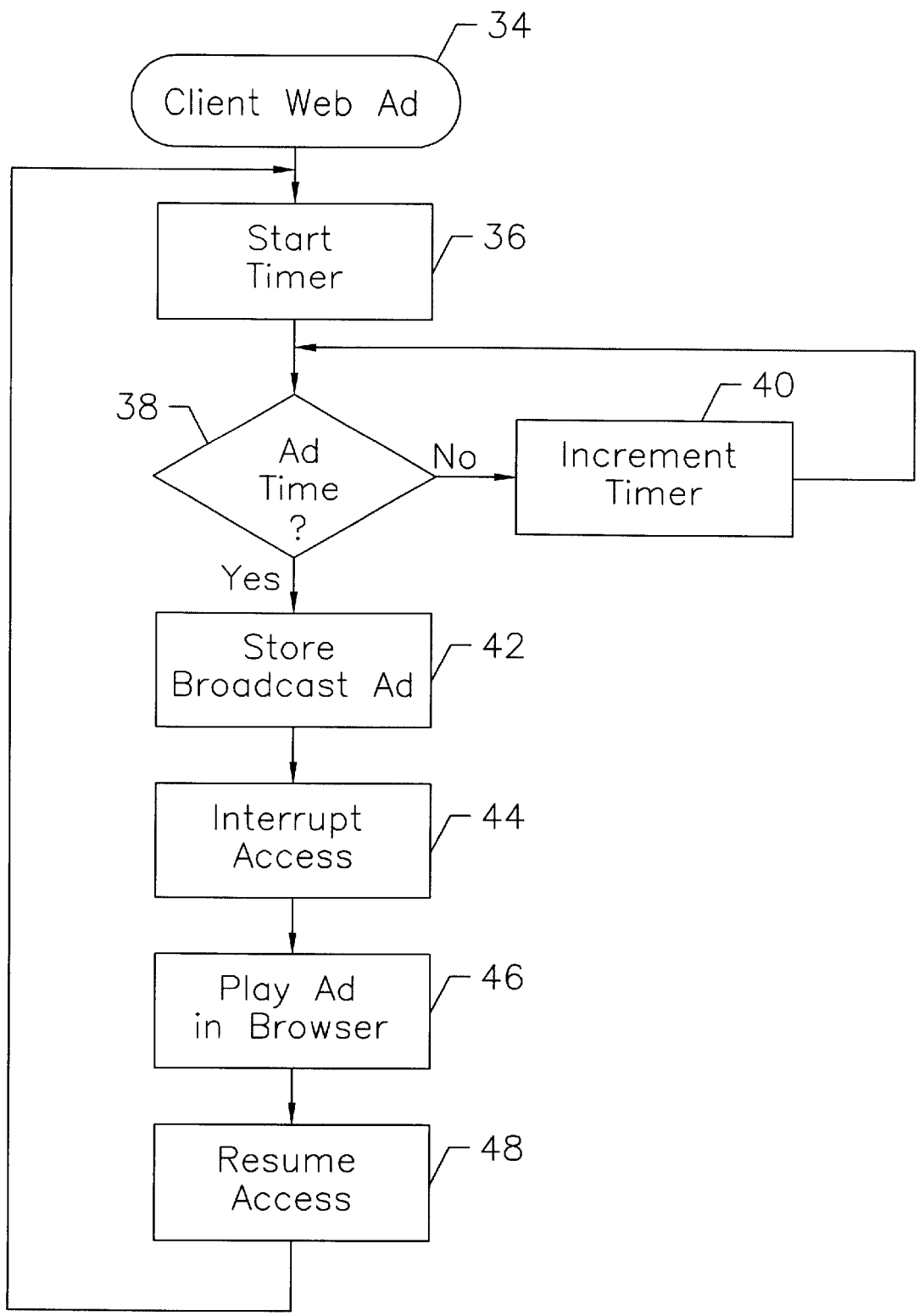
FIG. 3 is a flow chart for software implemented on a client in accordance with one embodiment of the present invention.

Referring to FIG. 3, the software 34, resident on the client system 18, may be in the form of a plug in to an Internet browser. However, in some embodiments of the present invention, the software 34 may also be separate from the browser. The flow begins by initiating a timer, as indicated in block 34. At diamond 38, a check determines whether an advertisement broadcast time has arrived. This is determined by checking the information downloaded from the advertisement time database 14 and comparing it to the current time. If there is a match between the current time and the broadcast time of an advertisement, the broadcast advertisement is automatically stored on the client system 18, as indicated in block 42. The storage may be accomplished using a conventional video cassette recorder, as one example. However, it may be more advantageous to use a conventional broadcast pause and resume system that stores video information on a hard disk drive. One commercially available example of such a system is the system available from TiVo, Inc., Sunnyvale, Calif.

At periodic intervals, determined by a software timer, the ongoing receipt of content or services through the web site server 12 may be interrupted, as shown in block 44. At such times, the broadcast advertisement may be automatically displayed. In some embodiments of the present invention, it may be displayed as a reduced size picture-in-picture display with audio. In other embodiments, it is displayed full screen. When the broadcast commercial is being replayed, the content or services provided through the web site server 12 are automatically interrupted without loss of content or service. Thus, the advertisement may actually be played through an Internet browser in accordance with one embodiment of the present invention as shown in block 46.

Once the advertisement has been completely played, access to the content or services may be resumed, as indicated in block 48. Thereafter, the timer is again started. If the ad time had not yet arrived, as determined at diamond 38, the timer may be incremented as indicated in block 40 and the flow continues to wait until the advertisement broadcast time arrives.

Figure 4:
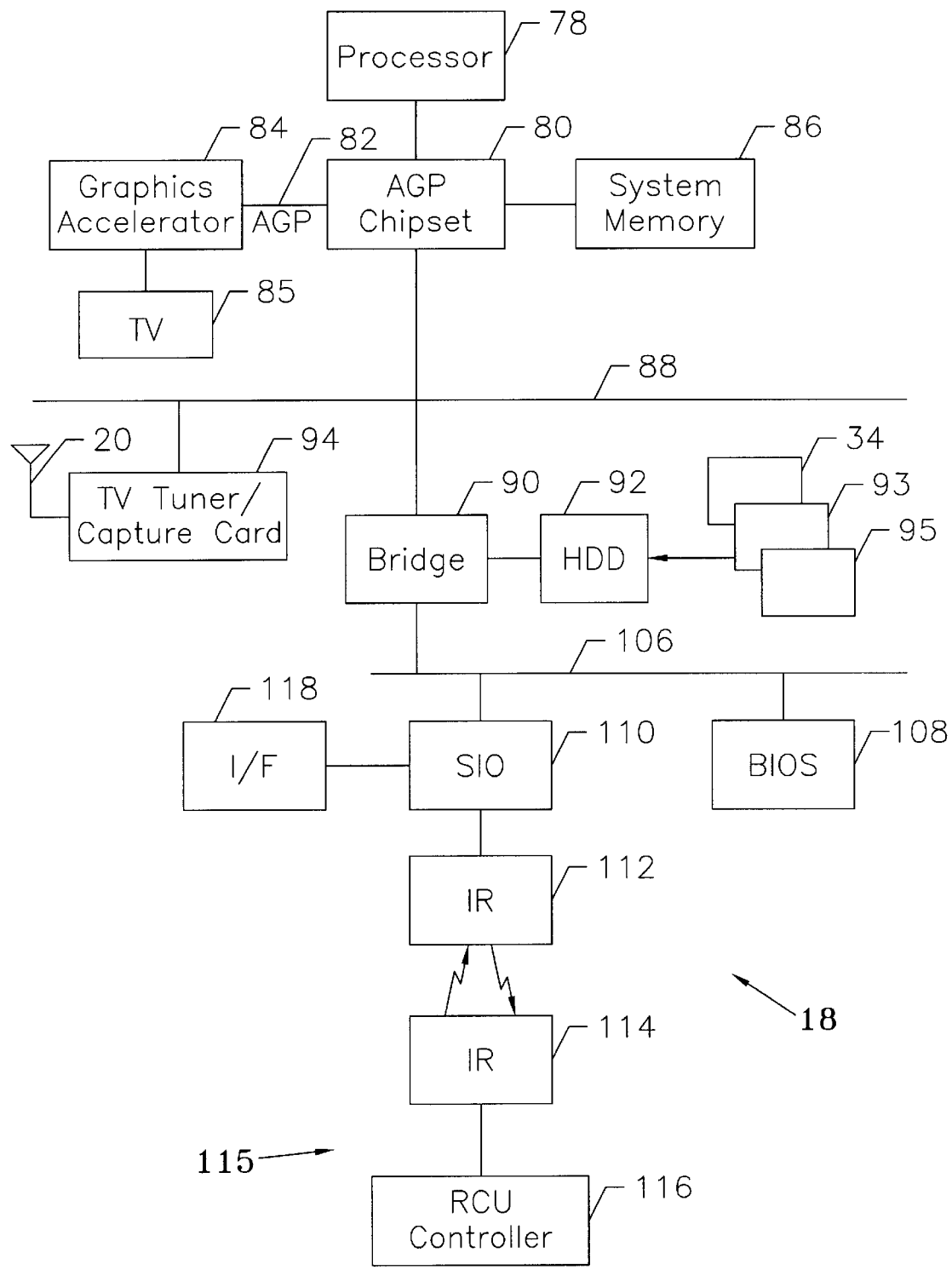
FIG. 4 is a block diagram of the client in accordance with one embodiment of the present invention.

Referring to FIG. 4, in accordance with one embodiment of the present invention, the client system 18 may be a set-top box. However, in other cases, any of a variety of other types of processor-based systems may be utilized.

A processor 78 may be coupled to an accelerated graphics port (AGP) (see Accelerated Graphics Port Interface Specification, Rev. 1.0, published Jul. 31, 1996 by Intel Corporation, Santa Clara, Calif.) chipset 80 for implementing an accelerated graphics port embodiment. The chipset 80 communicates with the AGP port 82 and the graphics accelerator 84. A television 85 may be coupled to the video output of the graphics accelerator 84. The chipset 80 also accommodates the system memory 86.

The chipset 80 may be coupled to a bus 88. The bus 88 is in turn coupled to an interface, such as a television tuner/capture card 94. The television tuner/capture card 94 is coupled to an interface such as an antenna or other port 20 including a cable input port, a satellite receiver/antenna or an airwave broadcast antenna as examples. The television tuner/capture card 94 selects a desired television channel and also performs a video capture function. One suitable video capture card is the ISVR-III Video Capture Card available from Intel Corporation.

The bus 88 is also coupled to a bridge 90 which may couple a storage device such as a hard disk drive 92. The drive 92 may store the software 34 as well as the commercial advertisements 93. It may also store the browser software 95.

The bridge 90 may also be coupled to another bus 106. The bus 106 may be in turn coupled to a serial input/output (SIO) device 110. The SIO device 110 may be coupled to an Internet interface 118. The SIO device 110 may also be coupled to an interface 112 such as an infrared interface. Alternatively, the interface 112 may be implemented by other airwave communication techniques as well. The interface 112 may communicate via infrared signals with an infrared interface 114 of a remote control unit 115. The remote control unit 115 may also include a controller 116.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

detecting an event;

in response to the detection of an event, automatically accessing an advertisement distributed over a first medium;

accessing content from a second medium;

displaying said advertisement in association with the content from said second medium; and interrupting said content and displaying said advertisement.

2. The method of claim 1 wherein automatically accessing the advertisement includes accessing over the second medium, information about when the advertisement is to be distributed over the first medium.

3. The method of claim 2 wherein detecting the event includes comparing the current time with the time when the advertisement is to be distributed over the first medium.

4. The method of claim 1 wherein automatically accessing the advertisement includes automatically accessing the advertisement in response to an elapsed period of time.

5. The method of claim 1 wherein accessing said advertisement further includes automatically accessing the advertisement over a television distribution system.

6. The method of claim 1 wherein accessing content further includes accessing content over the Internet.

7. An article comprising a medium storing instructions that enable a processor-based system to:

detect an event;

access an advertisement distributed over a first medium in response to the event;

provide access to content from a second medium;

display the advertisement in association with the content from the second medium; and interrupt the content and display the advertisement.

8. The article of claim 7 further storing instructions that enable a processor-based system to access information over a second medium about when the advertisement is to be distributed over the first medium.

9. The article of claim 7 further storing instructions that enable a processor-based system to access the content over the Internet.

10. A system comprising:

a first interface that automatically accesses an advertisement distributed over a first medium;

a second interface that accesses content over a second medium; and a processor coupled to said interfaces to provide access to said content with said advertisement.

11. The system of claim 10 wherein the first interface includes an interface to a television distribution system.

12. The system of claim 11 wherein the second interface includes an interface to the Internet.

* * * * *